United States Patent [19]

Roncaglione

[11] 4,320,551
[45] Mar. 23, 1982

[54] ANGLED SIDE BRUSH VEHICLE WASHING APPARATUS

[76] Inventor: James W. Roncaglione, 806 Bridleridge Ct., Vienna, Va. 22180

[21] Appl. No.: 119,579

[22] Filed: Feb. 7, 1980

[51] Int. Cl.³ .............................................. B60S 3/06
[52] U.S. Cl. ................................ 15/53 A; 15/DIG. 2
[58] Field of Search ............ 15/DIG. 2, 53 A, 53 AB

[56] References Cited

U.S. PATENT DOCUMENTS

| Re. 28,580 | 10/1975 | Hanna | 15/53 AB |
|---|---|---|---|
| 3,090,981 | 5/1963 | Vani et al. | 15/53 AB |
| 3,233,264 | 2/1966 | Nickl et al. | 15/53 A |
| 3,500,488 | 3/1970 | Grant | 15/53 AB |
| 3,588,935 | 6/1971 | Anttila | 15/53 A |
| 3,593,357 | 7/1971 | Oldham | 15/53 AB |
| 3,624,852 | 12/1971 | Hanna | 15/53 AB |
| 3,921,242 | 11/1975 | Clark | 15/53 AB |
| 4,118,820 | 10/1978 | Bivens | 15/53 AB |

FOREIGN PATENT DOCUMENTS

497422 11/1953 Canada ........................ 15/DIG. 2

Primary Examiner—Edward L. Roberts
Attorney, Agent, or Firm—Birch, Stewart, Kolasch & Birch

[57] ABSTRACT

A vehicle washing apparatus including, a frame containing an opening adapted to receive the vehicle to be washed, means for causing relative movement in a first direction between the frame and the vehicle, a pair of canted brushes rotatably disposed within the frame on opposite sides thereof, each of the brushes being pivoted about a vertical axis, the lower end of each of the brushes being spaced from the vertical pivot axis a distance less than that of the upper end of the brush, whereby the brushes rotate at an angle which is canted from the vertical axis, and means for biasing the opposing brushes toward each other whereby contact of the brushes with the vehicle is effected by the relative movement between the frame and vehicle against the bias.

21 Claims, 14 Drawing Figures

ANGLED SIDE BRUSH VEHICLE WASHING APPARATUS

BACKGROUND OF THE INVENTION

1. Field of the Invention

The present invention relates to vehicle washing apparatus which utilize angled side brushes.

2. Brief Description of the Prior Art

Automatic vehicle washers which utilize side brushes that are rotatable about a vertical pivot access are well known and widely used in the car wash industry. One problem associated with the use of side brushes which are rotatable about a vertical axis is that the bristles of the brushes wrap around radio and CB antennas thereby tearing the antennas from the car being washed. In order to alleviate this problem, it is necessary to rotate the side brushes about an axis which is canted about 30 degrees from the vertical. Various car washers which utilize angled side brushes are known in the art.

One example of a car washer which utilizes an angled side brush is disclosed in U.S. Pat. No. 4,110,865 issued to David J. Bivens, wherein each side brush is mounted for pivotal movement about a non-vertical pivot access. Air cylinders are utilized to pivot and press the side brushes into engagement with the sides of the vehicle to be washed. This arrangement is both expensive and inefficient for effecting complete washing of the car.

Another patent which utilizes angled side brushes is U.S. Pat. No. 3,233,264 issued to Nickl et al. This patent discloses the use of angled side brushes which are inclined from the vertical and which are mounted for pivotal movement about a non-vertical pivot access. The brushes are mounted so that the brushes are biased by their weight against the side surfaces of the vehicle.

Other car wash apparatus which utilize angled side brushes are known in the art, however, none of these apparatus offer the advantages of the present invention, as will be discussed further hereinbelow.

SUMMARY OF THE INVENTION

One of the primary objects of the present invention is to provide a vehicle washing apparatus which utilizes angled side brushes having an improved mounting, thereby preventing the tearing of antennas from the vehicles being washed.

Another object of the present invention is to provide a vehicle washing apparatus having angled side brushes which effects complete cleaning of the vehicle being washed while at the same time being inexpensive to manufacture and service.

Another object of the present invention is to provide a vehicle washing apparatus having angled side brushes wherein a movable frame containing the side brushes traverses the vehicle to be washed in both a forward and reverse direction.

The vehicle washing apparatus of the present invention includes a frame member having an opening adapted to receive the vehicle to be washed, means for causing relative movement between the frame member and the vehicle, a pair of angled brushes rotatably disposed within the frame member on opposite sides thereof and means for biasing the brushes toward each other whereby contact of the brushes with the vehicle is effected by the relative movement between the frame member and the vehicle. Each of the side brushes are mounted for pivotal movement about a vertical axis. The brushes are canted from the vertical at an angle greater than about 15 degrees, preferably between 15 and 45 degrees, more preferably between 20 and 45 degrees, and most preferably about 30 degrees.

In the preferred embodiment, the frame member moves along the length of a stationary vehicle. In operation, the vehicle to be washed pulls up to the vehicle washing apparatus and stops. An automatic sensor senses the presence of the vehicle to be washed and initiates the wash cycle of the apparatus. As the frame member, which includes the brushes, moves along the length of the vehicle, the brushes engage the front of the vehicle and pivot from a closed position to an open position whereby the side brushes contact respective sides of the vehicle. The pivotal movement of the brushes between the completely open and the closed positions is limited to between 5 and 60 degrees and is preferably between 25 and 50 degrees. When the frame has completely traversed the length of the vehicle and the brushes no longer engage the vehicle, the brushes again move to the closed position. The frame member then stops and reverses its direction whereby the brushes engage the rear of the vehicle, pivot to the open position and continue to traverse the length of the car in the reverse direction until the frame member returns to the initial position.

In one embodiment, each angled side brush further includes an additional brush located below the angled brush which is rotated about a vertical axis. The vertical brush washes the lower portions of the vehicle such as the rocker panels while the angled side brush washes the upper portions of the vehicle where the antennas are located.

BRIEF DESCRIPTION OF THE DRAWING

Other objects and advantages of the present invention will become apparent from a study of the following detailed description and drawing in which.

DETAILED DESCRIPTION OF THE INVENTION

Figure 1:
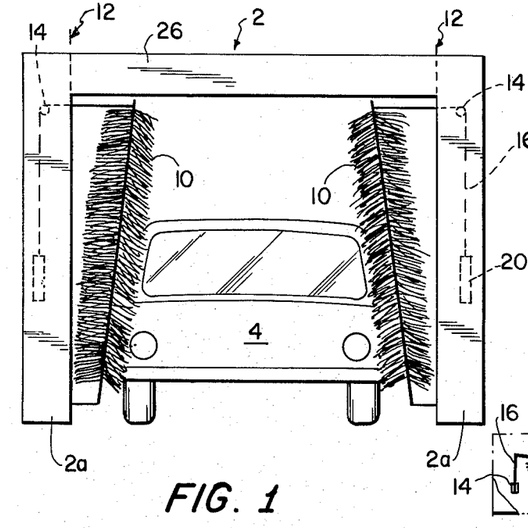
FIG. 1 is a front elevational view of the vehicle washing apparatus of the present invention with the side brushes in the closed position before the vehicle washing cycle has begun.
Figure 2:
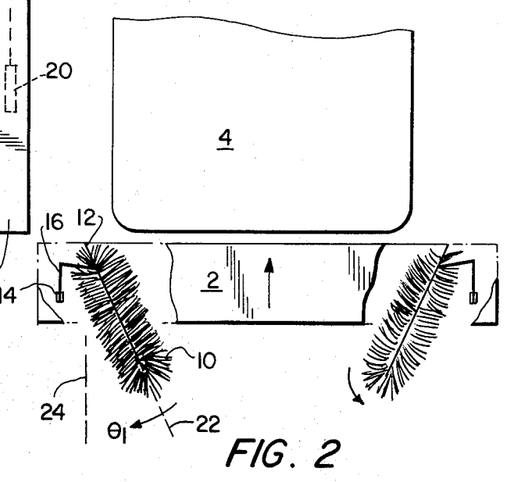
FIG. 2 is a partially broken away top plan view of FIG. 1.
Figure 6:
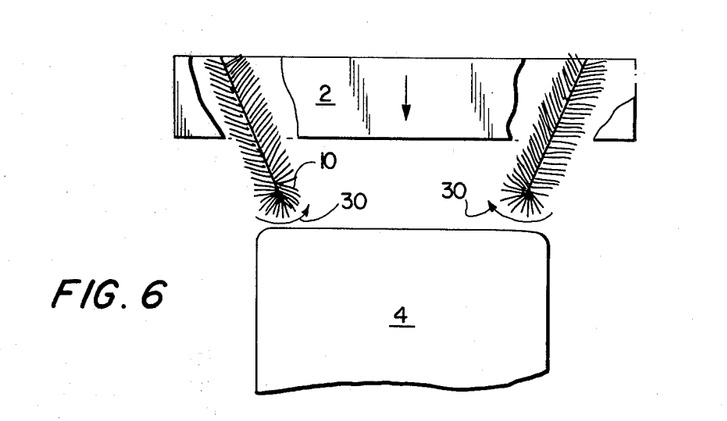
FIG. 6 is a partially broken away top view of the vehicle washing apparatus with the side brushes in the closed position just before the reverse motion of the frame member has begun.
Figure 7:
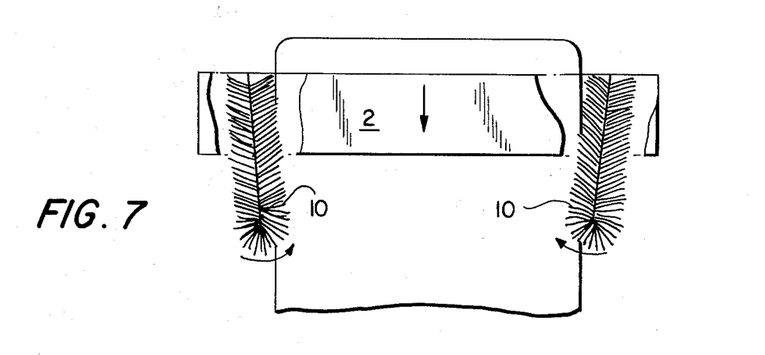
FIG. 7 is a partially broken away top view of the vehicle washing apparatus during the return motion of the frame member.

As shown in FIG. 1, the vehicle washing apparatus of the present invention includes a frame member 2 having an opening therein adapted to receive a vehicle 4. The frame member 2 includes a pair of generally vertical side portions 2a disposed on either side of the vehicle 4 connected by a generally horizontal top portion 2b. A pair of rotatable side brushes 10, which rotate about an axis which is angled from the vertical, are connected with the side portions 2a of the frame 2 for pivotal movement about a vertical pivot axis 12. The brushes are biased toward each other to a closed position by a biasing means which includes a pulley 14 and a flexible cable 16, one end of which is attached to the brush support 18 and the other end of which is attached to a weight 20. A vertically displaceable rotatable top brush (not shown) which is rotatable about a horizontal axis is also provided for washing the top of the vehicle. As shown in FIG. 2, the axis of rotation of each side brush 10 is contained in a vertical plane which is indicated by the dotted line 22. The vertical plane 22 and the vertical plane 24, which is oriented in the direction of the longitudinal axis of the car, define therebetween an angle $\theta_1$ which is at most 45 degrees and is preferably 20 degrees or less in the closed position. As shown in FIG. 1, the lower ends of the axes of rotation of the brushes 10 are spaced from each other a distance which is greater than the width of the vehicle to be washed in the closed position. As the frame member moves in the direction of the arrow indicated in FIG. 2, the side brushes 10 contact the sides of the car and rotate about the vertical pivot axis 12 to the open position shown in FIGS. 3 and 4 against the bias of the weights 20. As a result of the pivotal movement caused by the contact of the brushes 10 with the sides of the vehicle 4, the angle $\theta_1$ of FIG. 2 is reduced to between 0 and about 10 degrees as shown in FIG. 4. During washing, the side brushes 10 substantially conform to the angle of inclination of the side of the car 4 as shown in FIG. 4 thereby effecting complete washing of the sides of the car. At the same time, the side brushes 10 are angled relative to the vertical antenna 25 at an angle of greater than 15°, preferably between 15° and 45°, more preferably about 30° and most preferably between 20° and 45°. In the preferred embodiment shown in FIG. 9 the angle of the side brush 10 from the vertical is preferably about 30°. As the frame member 5 continues to move in the direction of the arrow shown in FIG. 2, the frame member eventually traverses the length of the car and the side brushes 10 become disengaged from the sides of the car 4 and return to the closed position as shown in FIG. 6. The direction of rotation of the brushes 10 is reversed during the return movement of the frame member 2 across the car 4. The direction of rotation of the brushes is shown by the arrows 30 in FIG. 6. It is advantageous but not necessary for the lower ends of the axes of rotation of the brushes 10 to be spaced from each other, in the closed position, a distance which is greater than the width of the vehicle to be washed so that the brushes freely pivot to the open position upon contacting the car during the return movement at the frame member. By rotating the brushes 10 in the direction of the arrows shown in FIG. 6, the pivotal movement of the brushes 10 from the closed position to the open position is assisted by the contact of the bristles of the brushes with the back portion of the car 4. The frame member 2 then continues its return movement along the length of the vehicle as shown in FIG. 7 until it reaches the initial starting position shown in FIGS. 1 and 2.

Figure 8:
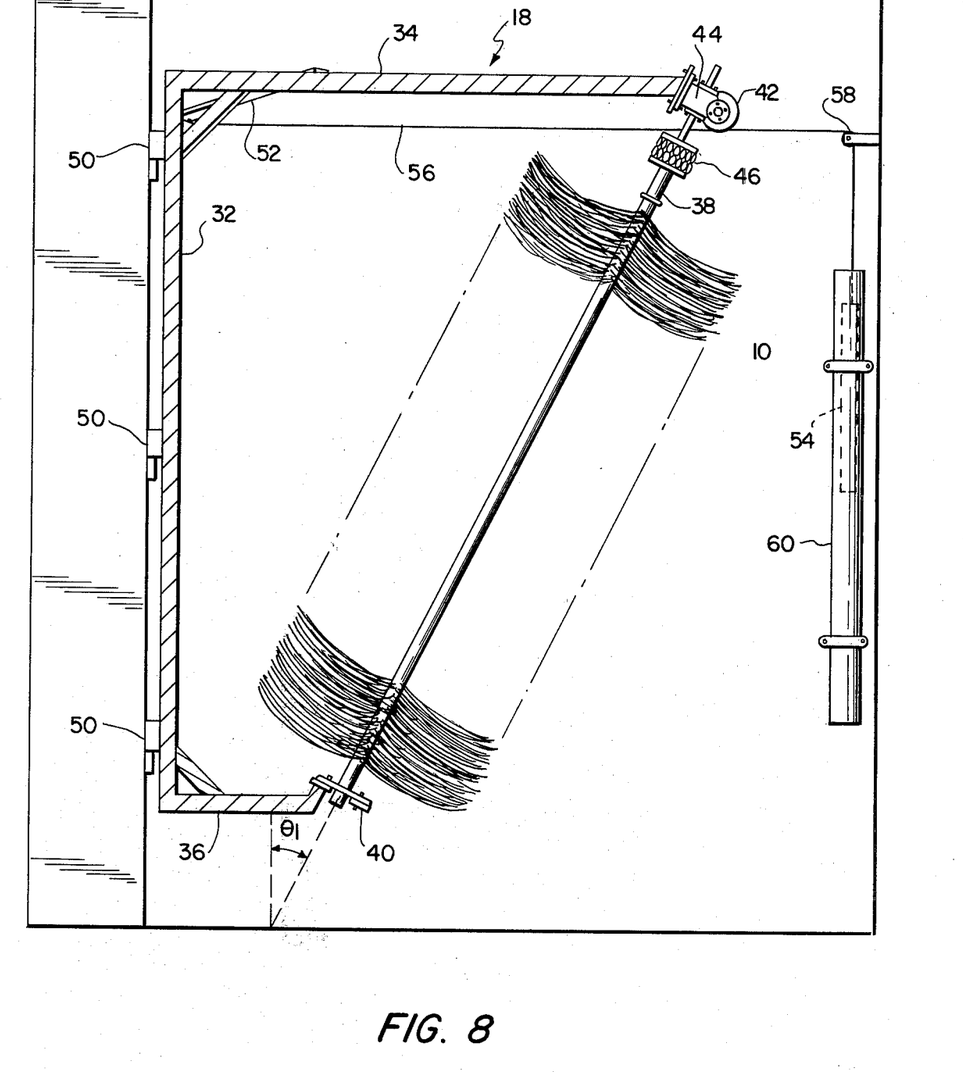
FIG. 8 is a side view taken along line 8—8 of FIG. 4.

As shown in FIG. 8, the brush supports 18 include a vertical support member 32, a generally horizontal upper support arm 34 connected with the upper end of the vertical support member 32 and a generally horizontal lower support arm 36 connected with the lower end of the vertical support member 32. The upper support arm 34 is longer than the lower support arm 36. The bristles of the brush 10 are attached to a rotatable rod 38a. The lower end of the rod 38 is secured to the end of the lower support arm 36 by a flange bearing 40. The upper end of the rod 38a is rotatably connected with the end of the upper support arm 34 and is rotatably driven by a motor 42, a geared transmission 44 and a dry coupling 46. The vertical support member 32 is pivotally connected with the side portion 2a of the frame member 2 by three pivots 50 whereby the support member rotates about a vertical pivot axis. The upper support arm 34 is provided with an arm 52. The brush support 18 and brush 10 are biased to the closed position by a weight 54. A flexible cord 56 which passes over a pulley wheel 58 connects the weight 54 with the arm 52 thereby biasing the brush toward the closed position. The weight 54 is slidably disposed within a plastic tube 60 which is mounted on the frame member.

Figure 9:
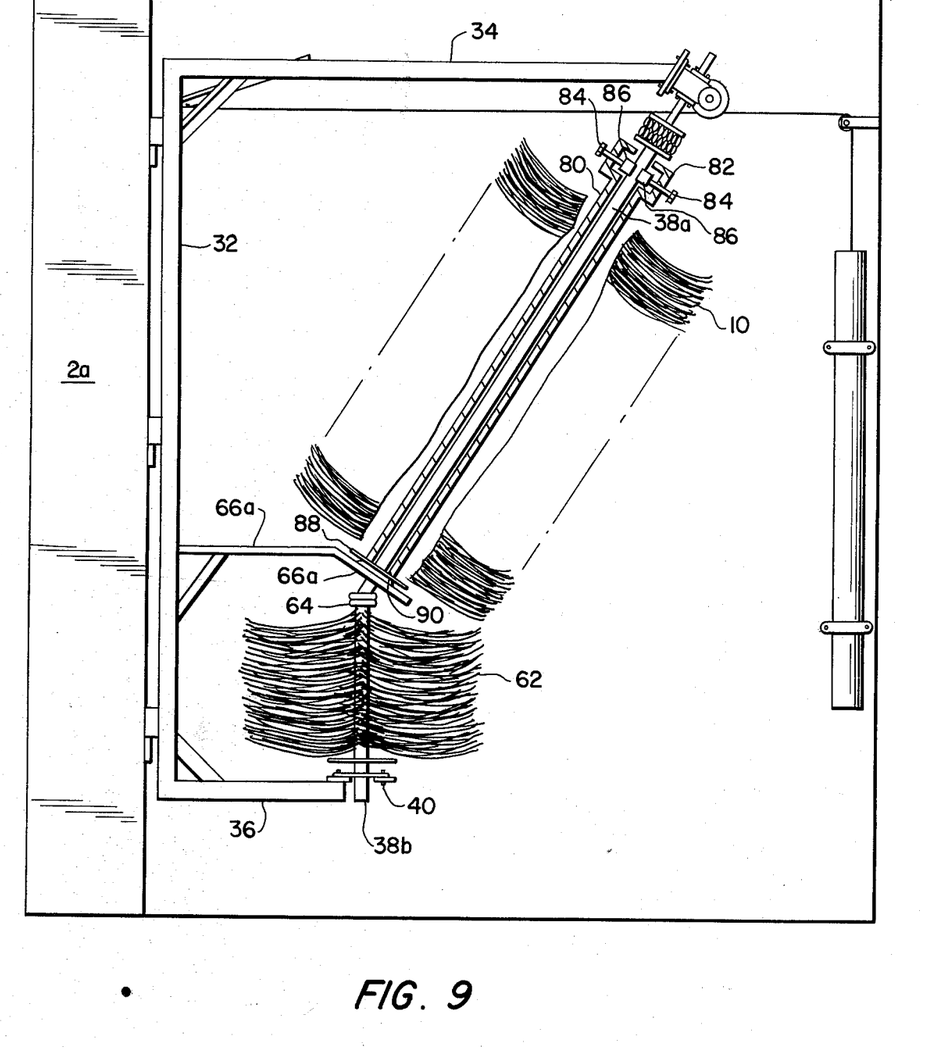
FIG. 9 is a partially broken away side view of the preferred embodiment of the side brush of the present invention.

In the preferred embodiment of FIG. 9, a second lower rotatable brush 62 is connected with the angled brush 10 for rotation about a vertical axis. The lower brush 62 is mounted for rotation about a rotatable rod 38b. The lower rod 38b and the upper rod 38a are rotatably connected by a universal joint 64. The upper rod 38a is rotatably supported by a horizontal support arm 66a which is attached to the vertical support arm 32. The rod 38a passes through a hole in an angled plate 66b which is canted at an angle perpendicular to the rod 38a.

An antenna saver slip mechanism is also provided on the top brush. The antenna saver mechanism slows down or stops the rotation of the top brush when it comes into contact with an antenna or a similar obstruction. The bristles of the brush 10 are connected with a hollow cylinder 80 which is circumferentially disposed about the rod 38a. One end of the cylinder 80 is provided with a housing 82. A pair of screws 84 passes through the housing 82 and adjustably press a pair of plastic or teflon crescent shaped shoes 86 against the rod 38a. The lower end of the cylinder 80 is provided with a disk shaped plate 88. The disk shaped plate 88 is urged against a teflon collar 90 which is secured to the upper surface of the angled plate 66b. The angled plate 66b and the disk shaped plate 88 prevent the bristles of the brushes from becoming entangled in the universal joint 64.

Figure 10:
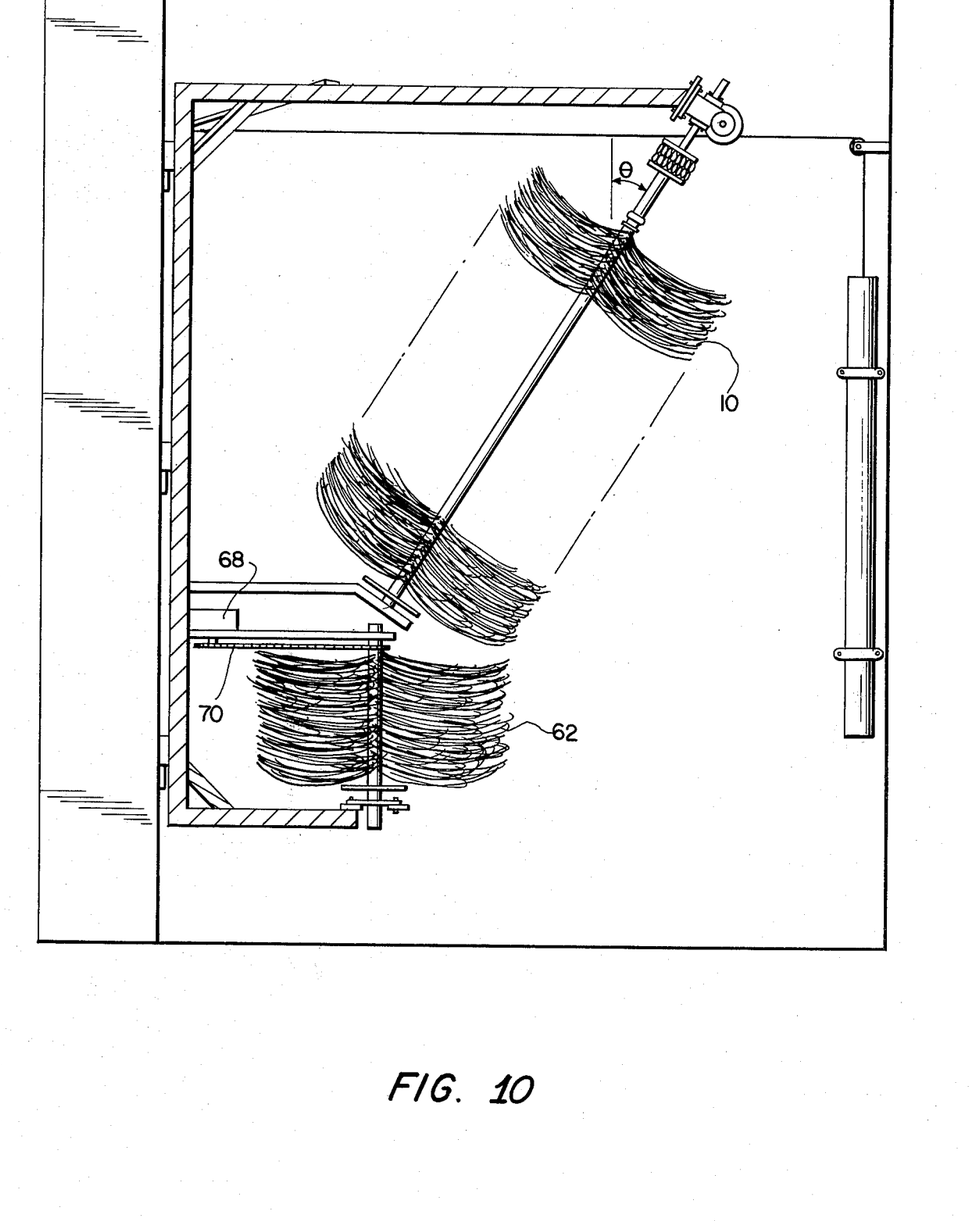
FIG. 10 shows another embodiment of the side brush of FIG. 9.

In operation, the motor rotates the rod 38a. Rotation of the rod 38a is transmitted to the rod 38b by the universal joint 64 and to the cylinder 80 and brush 10 by the crescent shaped plastic shoes 86. If the bristles of the brush 10 contact or become entangled with an antenna, the rod 38 a continues to rotate, however, the plastic shoes 86 slip relative to the rod 38a thereby slowing down or stopping the rotation of the angled brush 10 while allowing the lower brush 62 to rotate freely. By providing the lower brush 62, the angle of the upper brush 62 can be increased while keeping the length of the upper support arm 34 the same. However, the angle of the upper brush 10 is preferably the same as the brush 10 of FIG. 8. In the embodiment of FIG. 10, the lower brush 62 is independently driven relative to the upper brush 10 by a motor 68 and sprocket chain 70.

Figure 3:
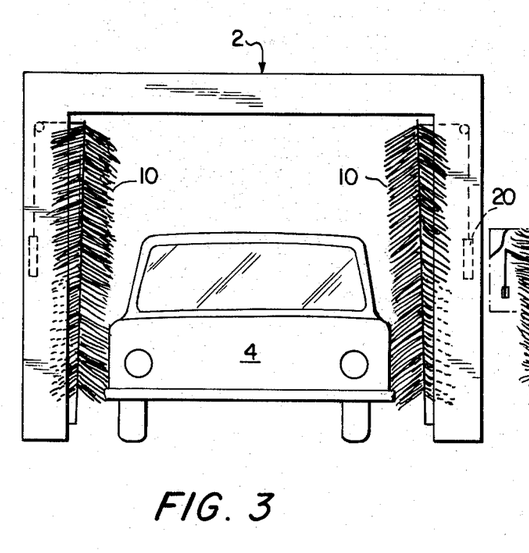
FIG. 3 is a front elevational view of the vehicle washing apparatus during the wash cycle with the side brushes in the open position.
Figure 4:
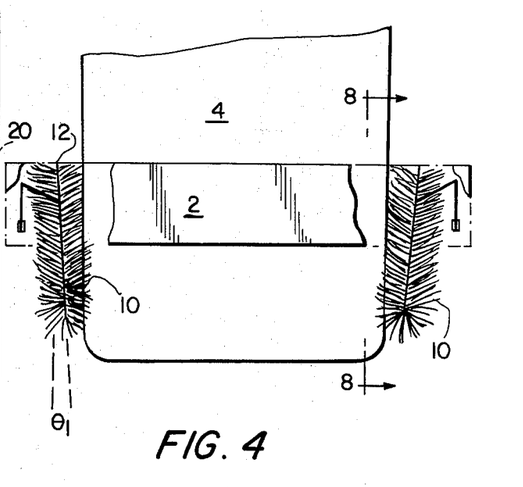
FIG. 4 is a partially broken away top plan view of FIG. 3.
Figure 11:
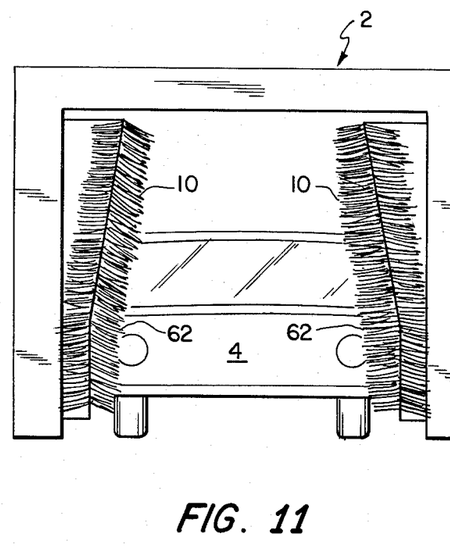
FIG. 11 is a front elevational view of the vehicle washing apparatus of the present invention utilizing the side brushes of FIG. 9 with the side brushes in the closed position before the vehicle washing cycle has begun.
Figure 12:
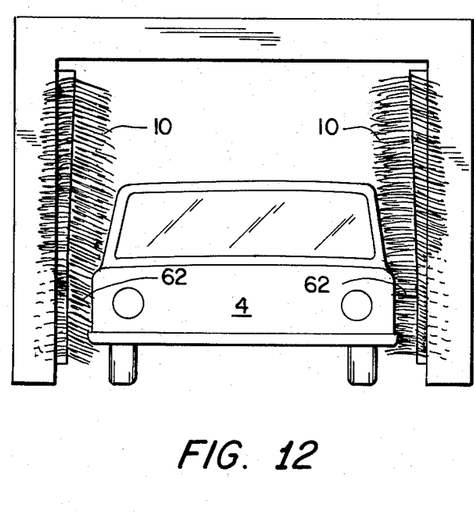
FIG. 12 is a front elevational view of FIG. 11 with the side brushes in the open position during the vehicle washing cycle.

FIGS. 11 and 12 correspond to FIGS. 1 and 3, respectively, except that the vehicle washing apparatus is provided with brushes of the type shown in FIG. 9.

Figure 13:
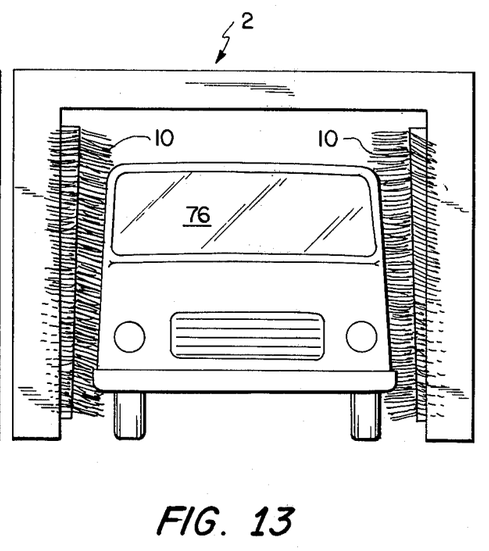
FIG. 13 is a front elevational view according to FIG. 3 with a van being washed and FIG. 14 is a front elevational view of a vehicle washing apparatus according to FIG. 1 adapted to wash a tractor trailer truck with brushes in the completely open position.

In the embodiment of FIG. 13 the side brushes 10 substantially conform to the sides of the van 76.

Figure 5:
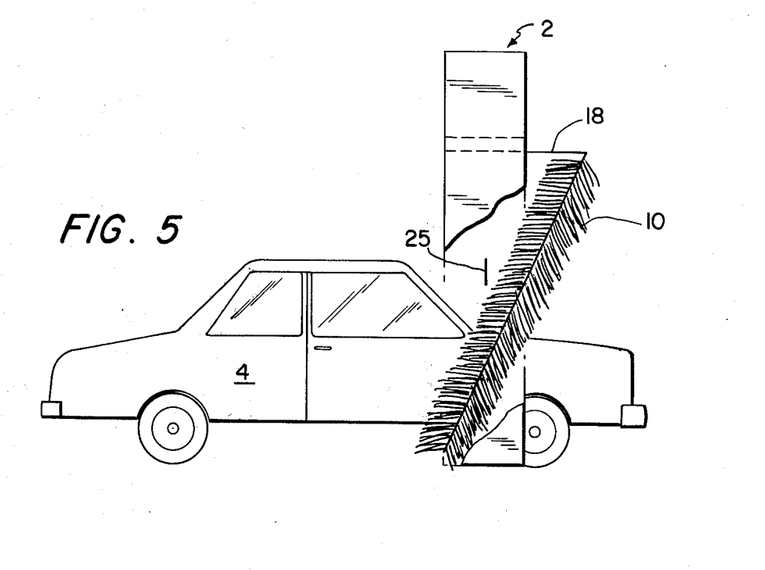
FIG. 5 is a partially broken away side elevational view of the vehicle washing apparatus in the position shown in FIG. 4.
Figure 14:
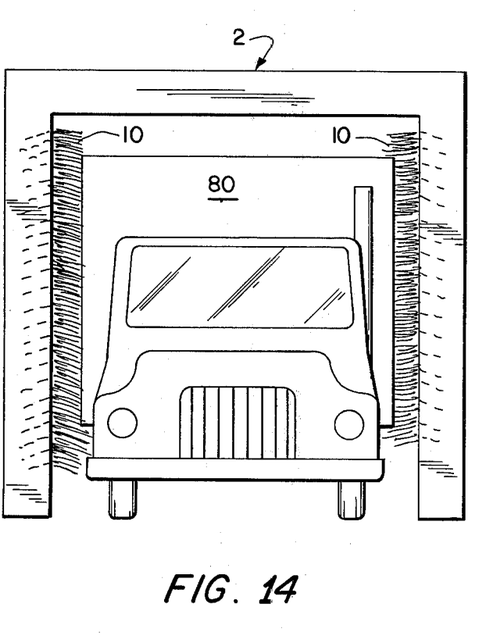

In the embodiment of FIG. 14, wherein a tractor trailer truck is being washed, the brushes 10 are spaced from each other a distance such that in the open position, the rotation axis of each brush 10 is contained in a vertical plane which is substantially parallel to the sides of the trailer 80 whereby the sides of the trailer are efficiently washed. However, as shown in FIG. 5, the axes of rotation of the brushes 10 are inclined at an angle of about 30° relative to the vertical thereby preventing tearing of the antennas from the truck.

What is claimed is:

1. A vehicle washing apparatus, comprising:
   (a) a frame member containing an opening adapted to receive the vehicle;
   (b) means for causing relative movement in a first direction between said frame member and said vehicle;
   (c) a pair of canted brush members rotatably disposed within said frame member on opposite sides thereof, each of said brush members being pivoted about a vertical axis, each of said brush members including a lower first brush rotatable about a substantially vertical axis of rotation for washing the lower vertical portions of said vehicle and a second brush rotatable about an axis of rotation inclined at an angle of about 15°–45° from the vertical for washing the upper side portions of said vehicle, the lower end of said lower brush being spaced from said corresponding vertical pivot axis a distance less than the upper end of said upper brush, the angle of inclination of said second brush being effective in preventing the tearing of antennas from said vehicle; and
   (d) biasing means for biasing said opposing brushes toward each other to a first closed position whereby contact of the brushes with the vehicle is effected by the relative movement between said frame member and vehicle, said contact causing pivotal movement of said brush members to a second open position against said bias.

2. A vehicle washing apparatus as defined in claim 1, and further including a pair of brush supports pivotally connected with said frame member, said brushes being rotatably connected with said brush supports.

3. A vehicle washing apparatus as defined in claim 2, wherein said brushes are canted from the vertical at an angle of between 20° and 45°.

4. A vehicle washing apparatus as defined in claim 2, wherein the pivotal movement of said brush supports is between 5° and 45°.

5. A vehicle washing apparatus as defined in claim 4, wherein in said first closed position the lower end of said axes of rotation of said lower brushes are spaced apart from each other at a distance which is greater than the distance between the upper ends of said upper brushes.

6. A vehicle washing apparatus as defined in claim 5, and further including means for causing relative movement between said vehicle and said frame member in a second direction opposite to said first direction.

7. A vehicle washing apparatus as defined in claim 6, wherein during washing, the vehicle remains stationary and said frame moves relative to the vehicle to be washed.

8. A vehicle washing apparatus as defined in claim 7, wherein during washing, said brushes rotate in a direction such that when said brushes contact the vehicle in the closed position, the contact of the brushes with the car facilitates the pivotal movement of the brush supports toward said second position.

9. A vehicle washing apparatus as defined in claim 2, wherein the pivotal movement of said brush supports is between 5° and 60°.

10. A vehicle washing apparatus as defined in claim 2, wherein said brush supports include upper and lower support arms connected to the upper and lower ends of said rotatable brushes, respectively.

11. A vehicle washing apparatus as defined in claim 2, wherein said baising means includes a pulley wheel connected with said frame member and a flexible member passing over said pulley wheel, one end of said flexible member being connected with said brush support and the other end thereof being attached to a weight.

12. A vehicle washing apparatus as defined in claim 2, wherein each of said brush supports further include a support arm which supports the rotatable rod of said upper brush.

13. A vehicle washing apparatus as defined in claim 12, wherein said support arm includes an angled plate through which said upper rotatable rod passes, said angled plate being angled at an angle substantially perpendicular to the angle of said upper angled brush.

14. A vehicle washing apparatus as defined in claim 1, wherein said axes of rotation and said vertical pivot axis are contained in a common vertical plane.

15. A vehicle washing apparatus as defined in claim 14, wherein in said second open position said common vertical plane is generally parallel to the side of the vehicle.

16. A vehicle washing apparatus as defined in claim 1, wherein said canted and vertical brushes each include a rotatable rod member, respectively, said corresponding rods being rotatably connected by a universal joint.

17. A vehicle washing apparatus as defined in claim 1, wherein said canted and vertical brushes are independently, rotatably driven.

18. A vehicle washing apparatus as defined in claim 1, which further includes means for slowing down the rotation of said angled brush when said angled brush contacts an antenna mounted on the vehicle being washed.

19. A vehicle washing apparatus, comprising:
   (a) a frame member containing an opening adapted to receive a vehicle;

(b) means for causing relative movement in a first direction between said frame member and said vehicle;
(c) a pair of brush members disposed on opposite sides of said opening, each of said brush members including (1) a brush support mounted for pivotal movement about a substantially vertical pivot axis, (2) a lower first brush rotatable about a substantially vertical first axis of rotation, said first brush being arranged for washing the lower vertical side portions of said vehicle, (3) an upper second brush rotatable about a second axis of rotational inclined at an angle of about 15°–45° from the vertical for washing the upper side portions of said vehicle, said pivot axis and said first and second axes of rotation being contained in a common vertical plane; and
(d) biasing means for biasing said opposing brushes toward each other to a first closed storage position wherein contact of said brushes with the vehicle caused by the relative movement of the vehicle and said frame causes pivotal movement of said brush members to a second open cleaning position against said bias.

20. A vehicle washing apparatus according to claim 19, wherein said biasing means includes a pulley, a weight and a flexible member which passes over said pulley connecting said weight with said frame member.

21. A vehicle washing apparatus according to claim 19, wherein said upper brush is provided with means for slowing down the rotation of said brush when the brush comes into contact with a car antenna or other obstruction.

* * * * *